United States Patent [19]

Kondo et al.

[11] Patent Number: 5,072,124

[45] Date of Patent: Dec. 10, 1991

[54] DISINFECTOR SYSTEM FOR DISINFECTING WATER BY ELECTRON BEAM

[75] Inventors: Masaki Kondo; Yasuhiko Seike; Nobuki Ito, all of Tokyo; Teijiro Miyata; Hidehiko Arai, both of Takasaki, all of Japan

[73] Assignee: Sumitomo Heavy Industries, Ltd., Tokyo, Japan

[21] Appl. No.: 585,699

[22] Filed: Sep. 20, 1990

[30] Foreign Application Priority Data

Sep. 22, 1989 [JP] Japan .................................. 1-240620

[51] Int. Cl.$^5$ ......................................... G01N 23/42
[52] U.S. Cl. ................................. 250/432 R; 250/434; 250/435; 250/436
[58] Field of Search .................. 250/432 R, 435, 436, 250/492.3, 492.1, 434, 428

[56] References Cited

U.S. PATENT DOCUMENTS

| | | | |
|---|---|---|---|
| 3,891,855 | 6/1975 | Offermann | 250/492.3 |
| 3,901,807 | 8/1975 | Trump | 250/432 R |
| 3,974,391 | 8/1976 | Offermann | 250/436 |
| 4,048,504 | 9/1977 | Bosshard | 250/432 R |
| 4,074,138 | 2/1978 | Bosshard | 250/435 |
| 4,201,918 | 5/1980 | Latzer | 250/432 R |
| 4,230,947 | 10/1990 | Cram | 250/492.3 |

Primary Examiner—Jack I. Berman
Assistant Examiner—Kiet T. Nguyen
Attorney, Agent, or Firm—Burns, Doane, Swecker & Mathis

[57] ABSTRACT

In a disinfector system for use in disinfecting a water current into a disinfected water current, the disinfector system comprises a conduit (22) which extends along a vertical direction. The conduit has an inlet port and an outlet port and guides the water current from the inlet port to the outlet port. The water current is shaped into a water current film by a shaping section (25) which is connected to the outlet port. The water current film is irradiated by an electron beam to be disinfected into the disinfected water current. The electron beam is produced by an irradiating section (12). The disinfected water current is spurted to a discharge section (13).

2 Claims, 2 Drawing Sheets

DISINFECTOR SYSTEM FOR DISINFECTING WATER BY ELECTRON BEAM

BACKGROUND OF THE INVENTION

This invention relates to a disinfector system for use in disinfecting municipal waste water into disinfected water from which pathogens are removed.

In general, chlorine is generally thrown into undisinfected water (simply called water hereinunder) to obtain disinfected water. In this event, it is known that a trihalomethane, which is one of carcinogens, is often produced in the disinfected water when the chlorine is used for disinfection. Therefore, it is desirable to disinfect the water by using another method. To this end, consideration has been made about irradiating the water with an electron beam to disinfect the water. Practically, a disinfector device is known which disinfects the water by irradiating the electron beam.

A conventional disinfector device is disclosed in an article contributed to Radiat. Phys. Chem. Vol. 24, No. 1 (1984), pages 179 to 190, under the title of "Electron Beam Process Design for The Treatment of Wastes and Economic Feasibility of The Process". In the conventional disinfector device, a water current is dropped from a water channel to a discharge section which is located below the water channel. While the water current is flowing or is being dropped, an electron beam is irradiated to the water current from a scan horn to disinfect the water current into a disinfected water current.

Another conventional disinfector device is disclosed in U.S. Pat. No. 3,891,855. In this disinfector device, a cone is rotated around its rotating axis so that water is formed into a water film along an inner wall of the cone. An electron beam is irradiated from a scan horn to the water film to disinfect the water film into a disinfected water.

By the way, the electron beam has a very short penetration distance when it is irradiated into water. For example, the transmission distance is 10 mm long even when the electron beam is accelerated by an accelerating voltage of 2 MeV. Therefore, it is necessary to form the water film in order to efficiently disinfect the water into the disinfected water.

However, it is difficult to form the wide water current film and to therefore disinfect a great amount of water at a high speed in the conventional disinfector devices.

SUMMARY OF THE INVENTION

It is an object of the invention to provide a disinfector device which is capable of disinfecting a great amount of water at a high speed.

It is another object of the invention to provide a disinfector device which is capable of stably disinfecting a great amount of water.

Other objects of this invention will become clear as the description proceeds.

A disinfector system to which this invention is applicable is for use in disinfecting a water current into a disinfected water current. The disinfector system comprises a channel section along which the water current flows, disinfecting means for disinfecting the water current into the disinfected water current, and a receiving section remote from the channel section in a vertical direction with a predetermined height left between the channel section and the receiving section for receiving the disinfected water current. According to this invention, the channel section comprises a conduit having an inlet port and an outlet port for guiding the water current from the inlet port to the outlet port and shaping means connected to the outlet port for shaping the water current into a water current film to spurt the water current film towards the receiving means. The conduit has along the vertical direction a height which is higher than the predetermined height. The disinfecting means comprises irradiating means for irradiating an electron beam to the water current film to disinfect the water current film by the electron beam and to thereby enter the disinfected water current.

DESCRIPTION OF THE PREFERRED EMBODIMENT

Figure 1:
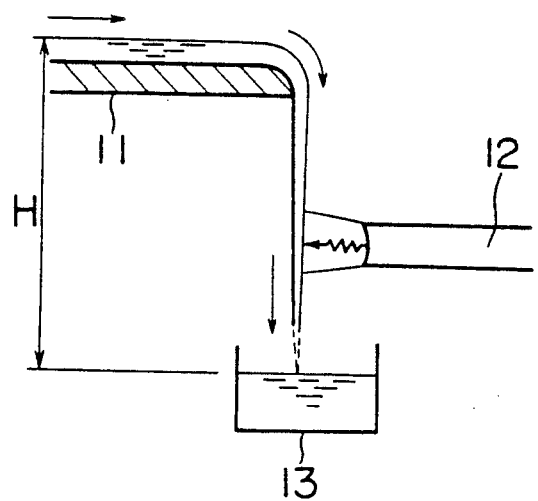
FIG. 1 is a systematic view of a conventional disinfector system.

Referring to FIG. 1, description will be made as regards a conventional disinfector system for a better understanding of this invention. The illustrated disinfector system is for disinfecting a water current into a disinfected water current or a clean water current by irradiating the water current with an electron beam. The disinfector system comprises a water channel 11, a disinfecting section 12, and a discharge section 13. The water channel 11 extends to a horizontal direction, namely, from a left side to a right side of FIG. 1. The discharge section 13 is remote from the water channel 11 in a vertical direction with a predetermined height, for example, 1 meter to 2 meters. The disinfecting section 12 is disposed between the water channel 11 and the discharge section 13.

The water channel 11 is connected to a first reservoir (not shown). The water current flows along the water channel 11 from a left side to a right side of FIG. 1. The water current drops downwardly as a water current film from a right edge of the water channel 11 to the discharge section 13 as shown in an arrow of a solid line. When the water current film drops downwardly or falls, the disinfecting section 12 irradiates the water current with an electron beam. As a result, the water current film is disinfected into a disinfected water current by irradiating the electron beam and fills the discharge section 13 with the disinfected water current. The disinfected water current is guided from the discharge section 13 to a second reservoir (not shown).

When the predetermined height is equal to H, the dropping speed v of the water current is theoretically represented by Equation (1) at the discharge section 13.

$$v=(2gH)^{\frac{1}{2}}, \qquad (1)$$

where g represents acceleration of gravity.

However, the water current is rendered into a turbulent flow when the water current drops downwardly at a high speed. Namely, it is difficult to stably form the water current film when the water current drops downwardly at the high speed. As a result, it is difficult to efficiently disinfect the water current into the disinfected water current. In order to efficiently disinfect the water current, the dropping speed v is practically defined between 2 and 3 meters per second. Such a dropping speed makes disinfection of a great amount of water difficult.

Figure 2:
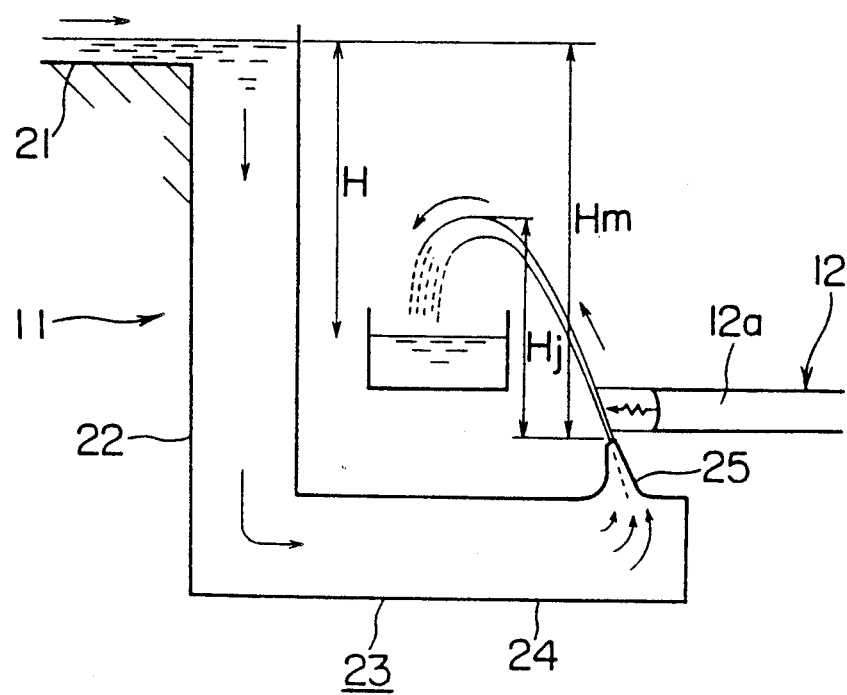
FIG. 2 is a systematic view of a disinfector system according to an embodiment of this invention.

Referring to FIG. 2, description will proceed to a disinfector system according to an embodiment of this invention. The illustrated disinfector system comprises similar parts which are designated by like reference numerals.

In FIG. 2, the water channel 11 comprises a channel section 21, a conduit section 22, and a shaping section 23. The channel section 21 is somewhat inclined rightwards of FIG. 1 along the horizontal direction and is connected to the first reservoir which may be a final settling pond of a waste water treatment plant (not shown). The conduit section 22 has an inlet port and an outlet port and is connected to the channel section 22 at the inlet port. The conduit section 22 has a height $H_m$ which is higher than the predetermined height H. The water current, which flows along the channel section 21, is guided along the conduit section 22 from the inlet port to the outlet port.

The shaping section 23 is connected to the conduit section 22 at the outlet port. The shaping section 23 comprises a horizontal conduit part 24 extending along the horizontal direction and a nozzle section 25 connected to the horizontal conduit part 24 at the angle of elevation between 60° and 85°, more preferably, at the angle of elevation between 75° and 85°.

Figure 3:
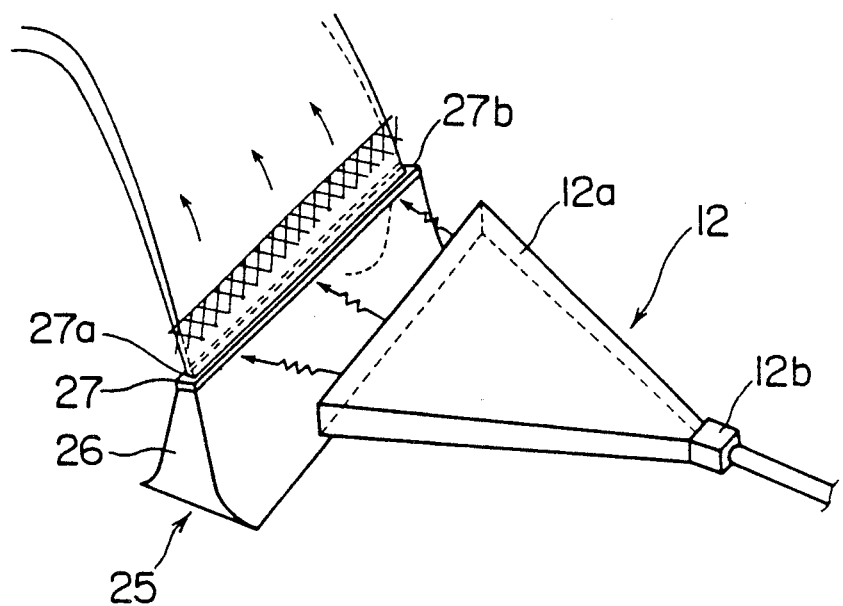
FIG. 3 is a view for illustrating a nozzle section which is used in the disinfector system of FIG. 2.
Figure 4:
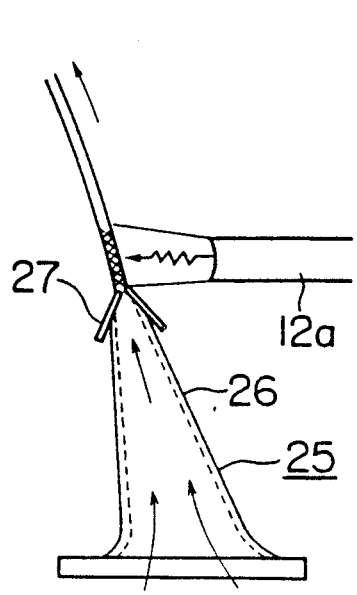
FIG. 4 is a view for illustrating an example of an irradiation of an electron beam.

Referring to FIG. 2 together with FIGS. 3 and 4, the nozzle section 25 comprises a nozzle body 26 and a nozzle 27 which is formed at the top of the nozzle body 26. The nozzle 27 has a slit 27a which extends from the front surface to the back surface of FIG. 2. The nozzle 27 has an adjusting valve 27b. The width of the slit 27a is variable by the adjusting valve 27b.

The disinfecting section 12 has a scan horn 12a which is directed rightwards of the nozzle 27. The scan horn 12a is connected to an accelerator (not shown) through a scanning chamber 12b. As a result, an electron beam is irradiated from the scan horn 12a.

Referring again to FIG. 2, the water current flows along the channel section 21 from the first reservoir and is guided from the inlet port to the outlet port through the conduit section 22. In the outlet port, the water current has potential energy in accordance with the height $H_m$. The water current is transmitted to the nozzle section 25 through the horizontal conduit part 24. The water current is spurted as a water current film from the slit 27a of the nozzle 27 to the discharge section 13 by the potential energy.

The spurting speed $v_m$ of the water current film is determined by the height $H_m$ and a whole pressure loss $\Delta P$ in the conduit section 22 and the nozzle section 23. Namely, the spurting speed $v_m$ is represented by Equation (2).

$$v_m = (2g(H_m - \Delta P))^{\frac{1}{2}} \qquad (2)$$

The whole pressure loss $\Delta P$ is lower than the predetermined height H. Namely, the conduit section 22 and the nozzle section 23 are designed such that the whole pressure loss $\Delta P$ becomes a value lower than the predetermined height H.

As described above, the water current film is spurted from the nozzle 27 to the discharge section 13 at the spurting speed $v_m$. When the water current film is spurted, the electron beam is irradiated from the scan horn 12a to the water current film to disinfect the water current film into the disinfected water current. The disinfected water current is entered into the discharge section 13. The disinfected water current is transmitted from the discharge section 13 to the second reservoir.

The length of the slit 27a corresponds with the width of the water current film. The width of the water current film is substantially identical with the width of the scan horn 12a. For example, the length of the slit 27a is equal to 1 meter to 4 meters. When electrons are accelerated to form the electron beam by an accelerating voltage of 5 MeV, the width of the slit 27a is selected to be less than a value between 18 mm and 25 mm.

Now, description will be made as regards the amount of water which is disinfected by the disinfector system.

Referring to FIG. 2, it is assumed that the predetermined height H between the channel section 21 and the discharge section 13 is equal to 2 meters. When it is assumed that the height difference $H_m$ between the channel section 21 and the nozzle section 23 is equal to 4 meters, the width of the slit 27a is equal to 10 mm, and the length of the slit 27a is equal to 2 meters, the relationship between the whole pressure loss $\Delta P$ and the spurting speed $v_m$ is represented by Equation (3) in accordance with an experiment.

$$\Delta P = 0.003 \, v_m^2 \qquad (3)$$

From Equations (2) and (3), the spurting speed $v_m$ is represented by Equation (4).

$$m_m = (2gH_m/(1 + 0.003 \times 2 \, g))^{\frac{1}{2}} \qquad (4)$$

As described above, $H_m$ is equal to 4 meters and g is equal to 9.8 m/sec². Therefore, $v_m$ is equal to 8.6 m/sec. When the water current film is spurted from the nozzle 27 at the spurting speed of 8.6 m/sec, the spurted water volume per second is equal to 0.172 m³/sec (the cross section of the slit 27a is equal to 0.02 m²). Therefore, the spurted water volume per day is equal to 14,861 m³.

It is assumed that the spurting height is $H_j$ when the water current film is spurted from the nozzle 27 and the angle of elevation is represented by $\theta$. The spurting height $H_j$ is represented by Equation (5).

$$H_j = (v_m \sin \theta)^2 / 2g \qquad (5)$$

When $\theta$ is equal to 75°, $H_j$ is equal to 3.52 meters. Therefore, the water current film can reach the discharge section 13, since a distance between the nozzle section 27 and the discharge section 13 is equal to 2 meters.

Figure 5:
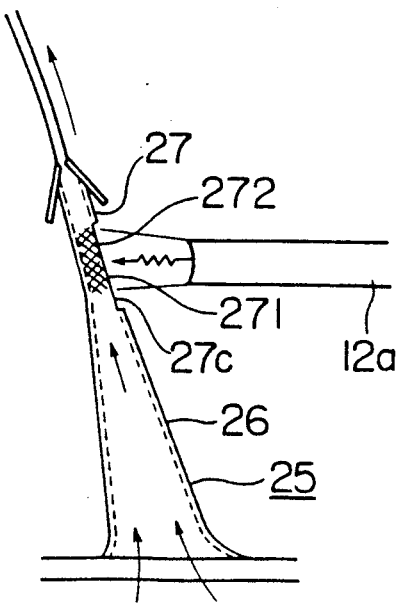
FIG. 5 is a view for illustrating another example of an irradiation of an electron beam.

Referring to FIG. 5, the nozzle body 27b may have an opening portion 271 which extends from the front surface to the back surface of FIG. 5. The opening portion 271 is covered by a metallic film 272 such as a titanium film so that an irradiation window 27c is formed by the opening portion 271 and the metallic film 272. Namely, the irradiation window 27c is formed on the nozzle body 27b.

The scan horn 12a faces the irradiation window 27c. As a result, the electron beam is irradiated from the scan horn 12a to the water current film through the irradiation window 27c. The water current film is disinfected into the disinfected water current by the electron beam.

By the way, it is possible at present to manufacture a scan horn having an irradiating opening of a length of 4 meters in maximum. In addition, it is possible to connect two scan horns to one electron accelerator. As a result, it is possible to disinfect water current of about 50,000 m³ per day when two scan horns are connected to the electron accelerator.

In case of disposing the electron accelerator in an underground, it is easy to carry out shading an X-ray which is slightly generated on producing the electron beam.

What is claimed is:

1. A disinfector system for disinfecting water current, said disinfecting system comprising:
    a channel section along which water current flows;
    means for disinfecting said water current into disinfected water current, said disinfecting means further including means for irradiating an electron beam toward a water current film spurted from said channel section to disinfect said water current film; and
    a receiving section for receiving said disinfected water current from said said channel section, said channel section further including:
    a conduit having an inlet port and an outlet port for guiding said water current from said inlet port to said outlet port;
    a nozzle section connected to said outlet port for shaping said water current into said water current film, said nozzle section having a slit shaped end portion for spurting said water current film from said nozzle section and further having a variable width to define a thickness of said water current film, said receiving section receiving disinfected water current spurted from said slit shaped end portion and being spaced from said inlet port by a predetermined vertical height which is less than a vertical height between said inlet port and said outlet port; and
    adjusting means for adjusting the width of said slit shaped end portion to control the thickness of said water current film.

2. A disinfector system as recited in claim 1, wherein said nozzle section further comprises:
    a nozzle body having an irradiating window which is irradiated by said electron beam so as to irradiate said water current film with said electron beam within said irradiating window.

* * * * *